INVENTOR.
JOHN W. GRAY

Dec. 23, 1958  J. W. GRAY  2,866,184
ANALOG TO DIGITAL CONVERTER
Filed Dec. 14, 1953  2 Sheets-Sheet 2
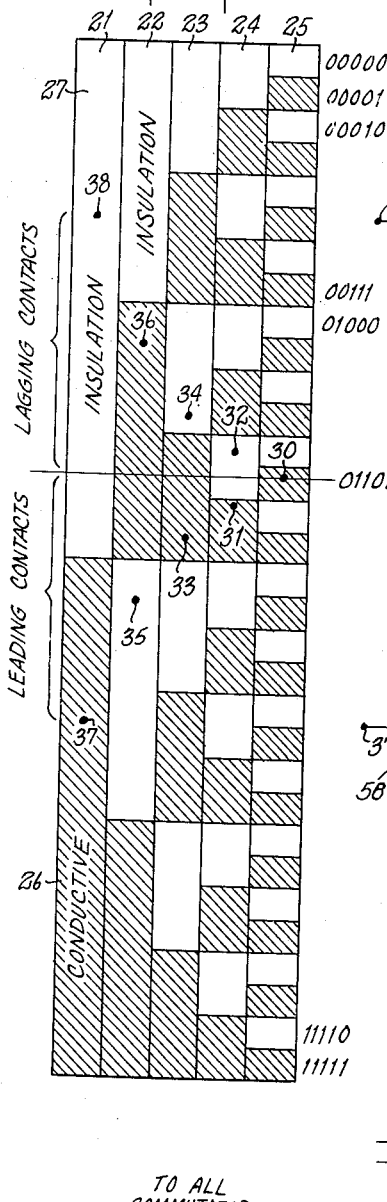
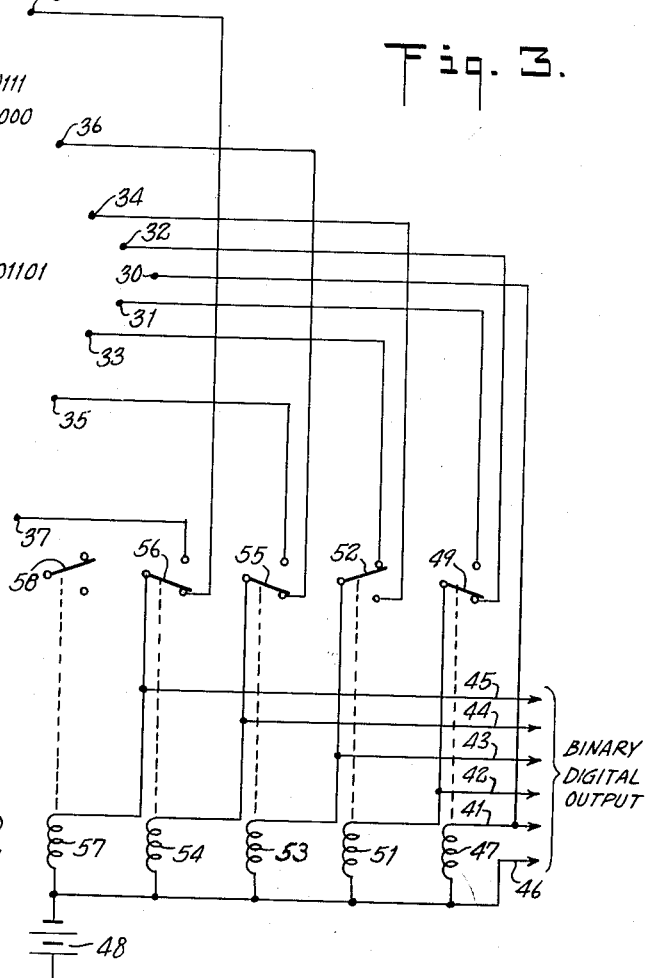
INVENTOR.
JOHN W. GRAY
BY
ATTORNEY

United States Patent Office 2,866,184
Patented Dec. 23, 1958

2,866,184

ANALOG TO DIGITAL CONVERTER

John W. Gray, Pleasantville, N. Y., assignor to General Precision Laboratory Incorporated, a corporation of New York Application December 14, 1953, Serial No. 397,905

8 Claims. (Cl. 340—347)

This invention relates in general to analog to digital converters and more particularly to apparatus for converting analog quantities represented by the angular position of a shaft to binary digital quantities.

Instruments for measuring physical quantities usually provide an output indication whose magnitude is indicative of the magnitude of the quantity being measured but whose form is altered. For example, temperature may be indicated by the length of a column of liquid; voltage may be indicated by the displacement of the needle of a meter. These displacements are analog quantities representative of the magnitude of the physical quantities being measured.

Modern control equipment frequently requires that mathematical operations be performed on the quantities representative of physical magnitudes. While it is possible to perform these mathematical operations directly upon the analog quantities, binary digital computers are often preferred because of their inherent greater accuracy. To secure the benefits of the accuracy of binary digital computers, it is necessary to convert the analog quantities into comparable binary digital quantities. Heretofore such converts have been either inaccurate or complex or both.

It is an object of this invention to provide an analog to digital converter which is both simple and accurate.

Another object is to provide such a converter which does not require close tolerances in its manufacture.

A more specific object is to provide an apparatus for converting the angular position of a shaft to a binary digital quantity.

In accordance with the invention, the shaft whose position is to be converted to a binary digital quantity is secured to a commutator comprising a plurality of rings. Each ring consists of equal length alternately arranged conductive and nonconductive segments. The first ring has one conductive and one nonconductive segment, each extending throughout half of its circumference. Each succeeding ring contains twice as many conductive and nonconductive segments as the next preceding ring. A stationary brush is arranged to bear upon the ring having the greatest number of segments. A pair of circumferentially spaced brushes bears on each remaining ring. All of the conductive segments are joined electrically and connected to a source of potential. The binary digital output comprises the potential of the single brush and the potential of one brush of each pair of brushes. The selection of one brush of each pair is made according to whether the succeeding selected brush has, or has not, a potential upon it.

For a complete understanding of the invention, reference may be made to the accompanying drawing in which:

Figure 2 is a developed view of a commutator suitable for use with the invention, showing the arrangement of brushes bearing thereon;

Figure 3 is a form of contact selector which may be used in the invention; and

Figure 1:
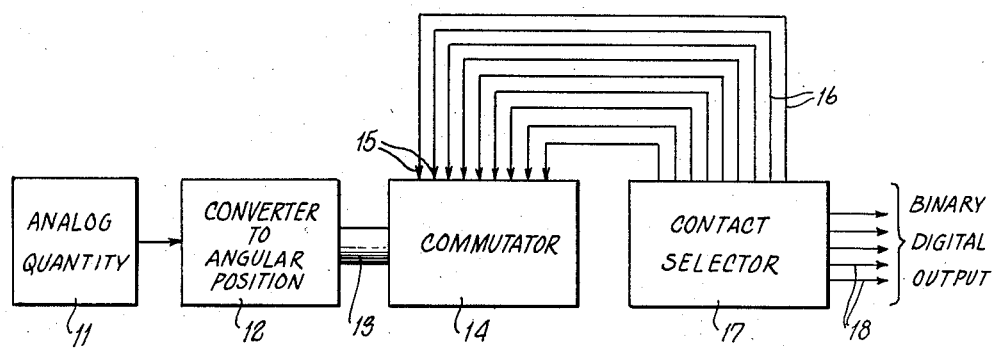
Figure 1 is a diagrammatical representation, including the invention, for converting an analog quantity to a binary digital quantity.

Referring first to Fig. 1, there is shown a representation 11 of any analog quantity, such as a voltage, pressure, displacement, or the like. As is well known, such a quantity may be converted to an angular position representative of that quantity. A converter 12, which may take many different forms, depending upon the nature of the input, converts the input to the form required for the operation of the invention, which is the angular position of a shaft 13. A commutator 14 is mounted for rotation by the shaft 13 and comprises a plurality of rings having alternate conductive and nonconductive portions, as will be more fully described. A plurality of stationary brushes 15 are arranged to bear upon the rings of the commutator and are connected by means of conductors 16 to a contact selector 17. The contact selector 17 connects selected ones of the conductors 16 to the output conductors 18. Each conductor 18 is in one of two possible conditions—it either has a potential on it or it doesn't. The condition of the conductors 18 is the binary digital output.

As shown in Fig. 2, the commutator 14 comprises five rings, 21, 22, 23, 24 and 25, each of which comprises alternate conductive and nonconductive segments. The ring 21 comprises conductive segment 26 and nonconductive segment 27, each of which covers one half of the circumference of the commutator 14. The ring 22 comprises two conductive segments and two nonconductive segments; the ring 23 comprises four conductive segments and four nonconductive segments; the ring 25 comprises eight conductive and eight nonconductive segments, while the ring 25 comprises 16 conductive and 16 nonconductive segments. In the drawing, the nonconductive segments are shown white, while the conductive segments are shown crosshatched. All the conductive segments are joined together electrically and connected to a source of potential.

Before considering the arrangement of the brushes in accordance with the invention, let us consider how a row of five brushes could be used to comprise an analog to digital converter. Consider a row of five brushes arranged in a line parallel to the axis of the commutator 14 with each brush bearing on one of the rings 21 to 25. As the commutator 14 revolves, each brush would be in one of two conditions—either it would have a potential upon it, or it would not. The condition of each brush would represent one place of binary number indicative of the angular position of the commutator 14. Suppose the brushes were arranged along the portion of the commutator indicated by 00000 in Fig. 2. If we write 0 for each brush which has no potential upon it and 1 for each brush having a potential, we see that this position of the brushes indicates the binary number 00000. If the commutator is rotated 1/32 of a revolution, these brushes would indicate the binary number 00001. Let us now see what happens when the commutator has rotated to the position represented by the number 00111 and is about to rotate further to the position indicated by the number 01000. In order for the device to indicate correctly, it is necessary that the brush on ring 22 make contact with its conductive segment at exactly the same instant that each of the brushes on rings 23, 24 and 25 leaves its respective conductive segments. Since the commutator 14 may stop in any position whatsoever, any inaccuracy in the change of these contacts will cause an error in the binary number indicated. For example, if the brush on ring 22 makes contact with its conductive segment before the other brushes have left their conductive segments, the erroneous number 01111 will be indicated. This invention is directed to means for eliminating such erroneous indications.

In Fig. 2, a plurality of stationary brushes are shown arranged to indicate the binary number 01101. The ring 25 is provided with a single brush 30 indicated by a dot in the drawing. Each of the other rings has two brushes, one of which leads the brush 30 and one of which lags the brush 30. The ring 24 has one brush 31 which is displaced in a circumferential direction so that it would tend to indicate a number larger than if it were aligned with brush 30. The ring 24 also has a second brush 32, displaced from brush 30 in the opposite direction. Similarly, the ring 23 is provided with a pair of brushes 33 and 34, the ring 22 with the brushes 35 and 36 and the ring 21 with the brushes 37 and 38.

The position of brush 30 relative to the commutator 14 is indicative of the last digit of the binary number. One brush of each of the remaining pairs of brushes can be selected to secure the remaining digits of the number indicative of the position of the brush 30. The rule for selecting the proper brush of each pair is simple. Starting with the brush on the ring containing the largest number of segments which, in this case, is brush 30, if this brush is on a conductive segment, the next preceding lagging brush is selected. If brush 30 is on a nonconductive segment, the next preceding leading brush is selected. The same rule is followed for the remaining pairs of brushes. We may apply this rule for the brush positions indicated in Fig. 2 as follows. The brush 30 indicates the last digit in the binary number. The brush 30 is on a conductive segment so that writing the figure backwards, or from right to left, we start with the Figure 1. Since brush 30 is on a conductive segment, the next brush selected will be the lagging brush of the pair, or brush 32, which is on a nonconductive segment so that the next figure of our number is 0. Since brush 32 is on a nonconductive segment, we next select the leading brush which is brush 33. This brush being on a conductive segment tells us to write the Figure 1 and to select the lagging brush next. This is brush 36, on a conductive segment, which tells us to write the Figure 1 and select the lagging brush of the next pair which is brush 38 on a nonconductive segment for which we write 0. It is further seen that the binary number, when written in conventional fashion, from left to right, is 01101.

The amount by which the various brushes lead and lag brush 30 is not critical. Brush 38, for example, may lag brush 30 by any amount less than one half the length of each segment on ring 21. Similarly, brush 35 may lead brush 30 by any amount less than one half the length of the segments of ring 22. For the sake of clarity in understanding the invention, all of the brushes have been shown in Fig. 2 displaced by substantially the maximum permissible amount. Brush 38, for example, may be in any position between the line through brush 30 and the position in which it is shown in Fig. 2. The design center for a manufactured product would preferably be a position half way between the line through the brush 30 and the position shown in the drawing. Similarly, the design center for the location of the other brushes would be midway between the positions shown in the drawing and the line through brush 30. It will be noticed that the tolerance for the position of the brushes increases for those brushes which indicate higher order digits.

It can be seen that as commutator 14 rotates under the brushes, brush 30 is the only brush whose position is critical to the determination of the binary number. Since the position of brush 30 represents the final digit of the number, this is as it should be.

Fig. 3 illustrates an apparatus which automatically performs the brush selection functions described above. Since the condition of brush 30 always represents the final digit of the number, the brush 30 is connected directly to the output conductor 41. This conductor, along with conductors 42, 43, 44, 45 and 46 represent the binary digital output of the apparatus. The condition of brush 30 not only represents the final digit of the binary number, but also determines which of the brushes 31 or 32 is selected to represent the next preceding digit. The brush 30 is therefore also connected to the operating winding 47 of a relay which operates a single pole double throw switch 49. The other end of winding 47 is connected to the output conductor 46 and also to a source of potential schematically indicated as comprising a battery 48. The other terminal of battery 48 is connected to the conductive segments of the commutator 14. In the position shown in Fig. 2, the brush 30 has a potential on it compared to conductor 46 and this potential energizes the relay winding 47 which connects the armature 49 to the lagging brush 32. The armature 49 is connected to the output conductor 42 so that the next to last digit of the binary number is determined by the condition of the brush 32. The armature 49 is also connected to the operating winding 51 of a relay which selects either brush 33 or brush 34 to determine the next preceding digit. In the position illustrated in Fig. 2, the brush 32 is on a nonconductive segment so that the leading brush 33 is selected by the armature 52 operated by the winding 51. In a similar manner, windings 53 and 54 operate relay armatures 55 and 56 to select brushes 36 and 38. The operating winding 57 and the armature 58 are not necessary to the system illustrated in Figs. 2 and 3, but are useful in those cases where more than one commutator is employed.

Figure 4:
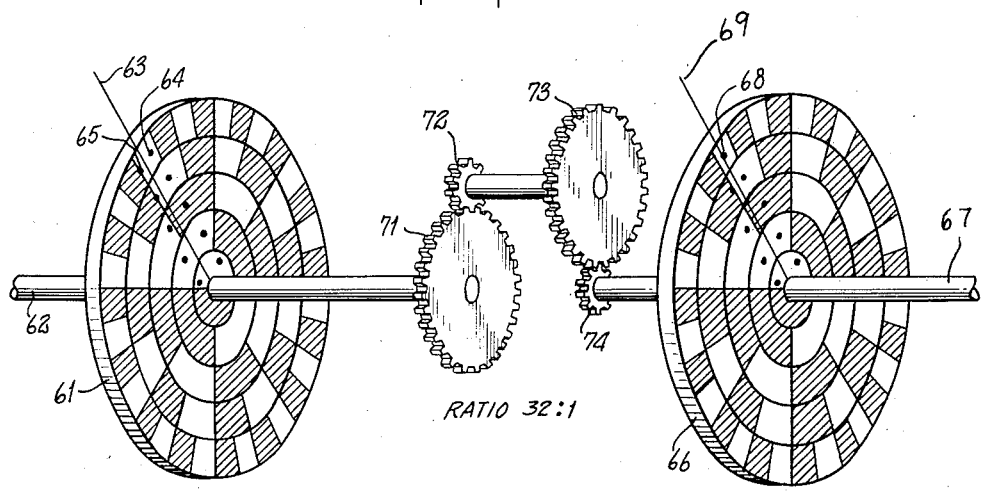
Figure 4 shows how two commutators may be used to obtain greater accuracy.

Figure 4 shows the use of two commutators geared together to increase the accuracy of the conversion. A disc commutator 61, having five rings is shown secured to a shaft 62. The inner ring of the commutator has one conductive segment, shown in white, and one nonconductive, or insulating, segment, shown crosshatched. Each segment extends 180°. The next ring is composed of two conductive and two nonconductive segments, each extending 90°. The third ring contains four conductive and four nonconductive segments; the fourth contains eight conductive and eight nonconductive segments; and the fifth contains sixteen conductive and sixteen nonconductive segments.

The radial line 63 represents the center line about which the stationary brushes are disposed. The actual brushes and the brush rig have been omitted from the drawing for the sake of clarity, but the positions of the brushes have been indicated by dots. The fifth, or outer, ring is provided with two brushes, 64 and 65, displaced in opposite directions from the center lines 63. The brush 64, which would tend to indicate a number greater than that defined by the center line 63, is denoted a leading brush, while the brush 65 is denoted a lagging brush. The brushes 63 and 64 may be displaced from the line 63 by any amount up to one half the width of a segment. In Fig. 4, they are shown displaced by approximately one quarter of the width of a segment, which distance is the proper design center. The remaining rings are also each provided with a pair of brushes similarly displaced from the line 63. It will be noticed that, in the case of the disc commutator, the linear tolerance of brush spacing is quite uniform.

A second commutator 66, identical to commutator 61, is secured to a shaft 67. Each of the four inner rings is provided with a pair of brushes disposed about a center line 69 as described in connection with commutator 61. The outer ring is provided with a single brush 68 located on the center line 69. The shafts 62 and 67 are connected through gears 71, 72, 73 and 74 having an overall ratio of 32 to 1 so that the commutator 66 makes 32 revolutions for each revolution of commutator 61.

All of the conductive segments of both commutators are connected together and to a source of potential. The binary digital output is represented by the potential condition of brush 68 and one brush of each pair of brushes. The proper brush of each pair is selected by applying the rule explained in connection with Fig. 2, and the selections may be made automatically by means such as that illustrated in Fig. 3.

The brush 68 represents the lowest order digit which, for the position of the commutators illustrated, is 0, since brush 68 is on a nonconductive segment. The next preceding leading brush is selected and this brush is also on a nonconductive segment. Therefore, this digit is also 0 and the next preceding leading brush is selected. In a similar manner, the remaining brushes are selected. The potential condition of the selected brush of the inner ring of commutator 66 selects one of brushes 64 or 65 on commutator 61. For the position, illustrated, brush 64 is selected. The binary number illustrated by the position of the commutators shown in Fig. 4 is 0010000100.

The input may be made to either shaft 62 or shaft 67. If shaft 62 is selected, the apparatus will provide a binary digital output indicative of the position of shaft 62 to within 1/1024 of a revolution. If shaft 67 is selected as the input, a binary digital output is provided which will "count" up to 32 revolutions of shaft 67 in units of 1/32 of a revolution.

It is apparent that the apparatus above described constitutes an analog to digital converter which is free of ambiguity, provides a binary digital output directly without the necessity for further conversion, and whose greatest possible error is one digit in the lowest order. Since the manufacturing tolerances are liberal, fabrication is relatively simple.

Although the described embodiment of the invention is an analog to binary digital converter, it is obvious that the invention may be applied to convert an analog quantity to other digital quantities, such as quinary or decimal. For example, a quinary converter for determining the angular position of a shaft to within one fifteenth of a revolution could comprise a six ring commutator. Single brushes could be used on the first four rings, and a pair of brushes on each of the last two rings. Accuracy would depend equally on the moment of transit of each of the single brushes and the maximum spacing of each pair of brushes would be less than the length of each segment on the first four rings. The use of pairs of brushes would eliminate ambiguities in "reading" the fifth and succeeding commutator rings.

Although the invention has been described in connection with a specific embodiment, many modifications may be within the scope of the invention. For example, Fig. 2 shows a commutator having five rings. It is obvious that a lesser or greater number of rings can be used. In the selector system of Fig. 3, it would be possible to take the output from auxiliary contacts instead of directly from the coil as shown. It would also be possible to employ an electronic contact selector instead of the relay system shown. Operation of separate commutators by "course" and "fine" servos is also possible. Many other modifications will occur to those skilled in the art.

What is claimed is:

1. Apparatus for representing the angular position of a shaft as a binary digital quantity comprising, a commutator mounted for rotation by said shaft, said commutator comprising a plurality of rings each divided into equal length alternately arranged conductive and nonconductive segments, the number of segments doubling on succeeding rings, a source of potential connected to all of said conductive segments, a single brush bearing on the ring having the gretatest number of segments, a pair of brushes bearing on each remaining ring, a plurality of output conductors on which the presence or absence of a potential represents a binary digital quantity, means for connecting said single brush to one of said output conductors, and means responsive to the potential of said single brush for connecting one brush of each pair to the remaining output conductors.

2. Apparatus for representing the angular position of a shaft as a binary digital quantity comprising, a commutator mounted for rotation by said shaft, said commutator comprising a plurality of rings each divided in equal length alternately arranged conductive and nonconductive segments, the number of segments doubling on succeeding rings, a source of potential connected to all of said conductive segments, a single brush bearing on the ring having the greatest number of segments, a pair of brushes bearing on each remaining ring, the brushes of each pair being displaced circumferentially in opposite directions from a line through said first brush perpendicular to the circumference of said ring by an amount less than one half the length of a segment on that ring on which the brushes are bearing, a plurality of output conductors on which the presence or absence of a potential represents a binary digital quantity, means for connecting said single brush to one of said output conductors, and means responsive to the potential of said single brush for connecting one brush of each pair to the remaining output conductors.

3. Apparatus for representing the angular position of a shaft as a binary digital quantity comprising, a commutator mounted for rotation by said shaft, said commutator comprising a plurality of rings each divided into equal length alternately arranged conductive and nonconductive segments, the number of segments doubling on succeeding rings, a source of potential connected to all of said conductive segments, a single brush bearing on the ring having the greatest number of segments, a pair of brushes bearing on each remaining ring, the brushes of each pair being displaced circumferentially in opposite directions from a line through said first brush perpendicular to the circumference of said rings, a plurality of output conductors on which the presence or absence of a potential represents a binary digital quantity, means for connecting said single brush to one of said output conductors, means responsive to the potential of said single brush for connecting one or the other of the next preceding pair of brushes to another of said output conductors, and means responsive to the potential of each connected brush for connecting one of the next preceding pairs of brushes to an output conductor.

4. Apparatus for representing the angular position of a shaft as a binary digital quantity comprising, a commutator mounted for rotation by said shaft, said commutator comprising a plurality of rings each divided into equal length alternately arranged conductive and nonconductive segments, the number of segments doubling on succeeding rings, a source of potential connected to all of said conductive segments, a single brush bearing on the ring having the greatest number of segments, a pair of brushes bearing on each remaining ring, the brushes of each pair being displaced circumferentially in opposite directions from a line through said first brush perpendicular to the circumference of said rings by an amount less than one half the length of a segment on that ring on which the brushes are bearing, a plurality of output conductors on which the presence or absence of a potential represents a binary digital quantity, means for connecting said single brush to one of said output conductors, means responsive to the potential of said single brush for connecting one or the other of the next preceding pair of brushes to another of said output conductors, and means responsive to the potential of each connected brush for connecting one of the next preceding pairs of brushes to an output conductor.

5. Apparatus for representing the angular position of a shaft as a binary digital quantity comprising, a commutator mounted for rotation by said shaft, said commutator comprising a plurality of rings each divided into equal length alternately arranged conductive and nonconductive segments, the number of segments doubling on succeeding rings, a source of potential connected to all of said conductive segments, a single brush bearing on the ring having the greatest number of segments, a pair of brushes bearing on each remaining ring, one brush of each pair lagging said single brush and the other brush of each pair leading said single brush, and means responsive to a potential on said single brush for connecting the lagging brush of the next preceding pair to another of said output conductors.

6. Apparatus for representing the angular position of a shaft as a binary digital quantity comprising, a commutator mounted for rotation by said shaft, said commutator comprising a plurality of rings each divided into equal length alternately arranged conductive and nonconductive segments, the number of segments doubling on succeeding rings, a source of potential connected to all of said conductive segments, a single brush bearing on the ring having the greatest number of segments, a pair of brushes bearing on each remaining ring, one brush of each pair lagging said single brush and the other brush of each pair leading said single brush, an output conductor connected to said single brush, an output conductor for each pair of brushes, means normally connecting the leading brush of each pair to its output conductor, and means responsive to a potential on any connected brush for disconnecting the leading brush and connecting the lagging brush of the next preceding pair to its output conductor.

7. Apparatus for representing the angular position of a shaft as a digital quantity comprising, a commutator mounted for rotation by said shaft, said commutator comprising a plurality of rings each divided into alternately arranged conductive and nonconductive segments, a source of potential connected to all of said conductive segments, a single stationary brush bearing on each ring determining a lowest order digit, a pair of stationary brushes bearing on each ring determining a higher order digit, a plurality of output conductors the potential condition of which represents the digital output, means for connecting each of said single brushes to an output conductor, and means responsive to the potential of one of said single brushes for connecting one of each of said pairs of brushes to the remaining output conductors.

8. Apparatus for representing the angular position of a shaft as a digital quantity comprising, a commutator mounted for rotation by said shaft, said commutator comprising a plurality of rings each divided into alternately arranged conductive and nonconductive segments, a source of potential connected to all of said conductive segments, a single stationary brush bearing on each ring determining a lowest order digit, a pair of stationary brushes bearing on each ring determining a higher order digit, the brushes of each pair being displaced circumferentially in opposite directions from a line through said first brush perpendicular to the circumference of said rings, a plurality of output conductors the potential condition of which represents a digital quantity, means for connecting each of said single brushes to an output conductor, and means responsive to the potential of one of said single brushes for connecting one of each of said pairs of brushes to the remaining output conductors.

References Cited in the file of this patent

UNITED STATES PATENTS

| | | |
|---|---|---|
| 2,318,591 | Couffignal | May 11, 1943 |
| 2,502,837 | Entz et al. | Apr. 4, 1950 |
| 2,666,912 | Gow et al. | Jan. 19, 1954 |
| 2,713,680 | Ackerlind | July 19, 1955 |